(12) United States Patent
Wilcox et al.

(10) Patent No.: US 6,990,462 B1
(45) Date of Patent: Jan. 24, 2006

(54) INVENTORY MANAGEMENT

(75) Inventors: Jason R. Wilcox, San Francisco, CA (US); Pavel M. Rozalski, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 09/596,195

(22) Filed: Jun. 17, 2000

(51) Int. Cl.
*G06F 17/60* (2006.01)

(52) U.S. Cl. .................................................. 705/14
(58) Field of Classification Search ................ 705/14
See application file for complete search history.

(56) References Cited

U.S. PATENT DOCUMENTS

| | | | | |
|---|---|---|---|---|
| 5,937,392 A | * | 8/1999 | Alberts .......................... | 705/14 |
| 6,026,368 A | * | 2/2000 | Brown et al. .................. | 705/14 |
| 6,029,195 A | * | 2/2000 | Herz ............................ | 725/116 |
| 6,141,010 A | * | 10/2000 | Hoyle ......................... | 345/854 |
| 6,144,944 A | * | 11/2000 | Kurtzman, II et al. ........ | 705/14 |
| 6,285,987 B1 | * | 9/2001 | Roth et al. ..................... | 705/27 |
| 6,434,745 B1 | * | 8/2002 | Conley et al. ............... | 717/177 |

FOREIGN PATENT DOCUMENTS

JP  10254966 A  *  9/1998

OTHER PUBLICATIONS

Jennifer Beauprez, Matching ads, eyeballs New head of MatchLogic tackles Web; [Rockies Edition]□□Denver Post Business Writer. Denver Post. Denver, Colo.: Apr. 24, 2000. p. E.01.*

* cited by examiner

*Primary Examiner*—Arthur Duran
(74) *Attorney, Agent, or Firm*—Ronald M. Anderson

(57) ABSTRACT

The inventory management of items, such as banner ads to be displayed on web sites, is disclosed. In one embodiment, a method constructs a number of item slot groups and a number of meta item slot groups. Each item slot group has a number of item slots. Each meta group encompasses one or more item slot groups, and has a number of item slots equal to the total number of item slots of its constituent groups. The method allocates each of a number of items of a first type over the item slots of the meta groups that are unfilled, by matching characteristics of the item to characteristics of the meta groups. The method also allocates each of a number of items of a second type over both the item slots of the meta groups as well as the groups that are unfilled, again by matching characteristics of the item to characteristics of the groups.

21 Claims, 10 Drawing Sheets

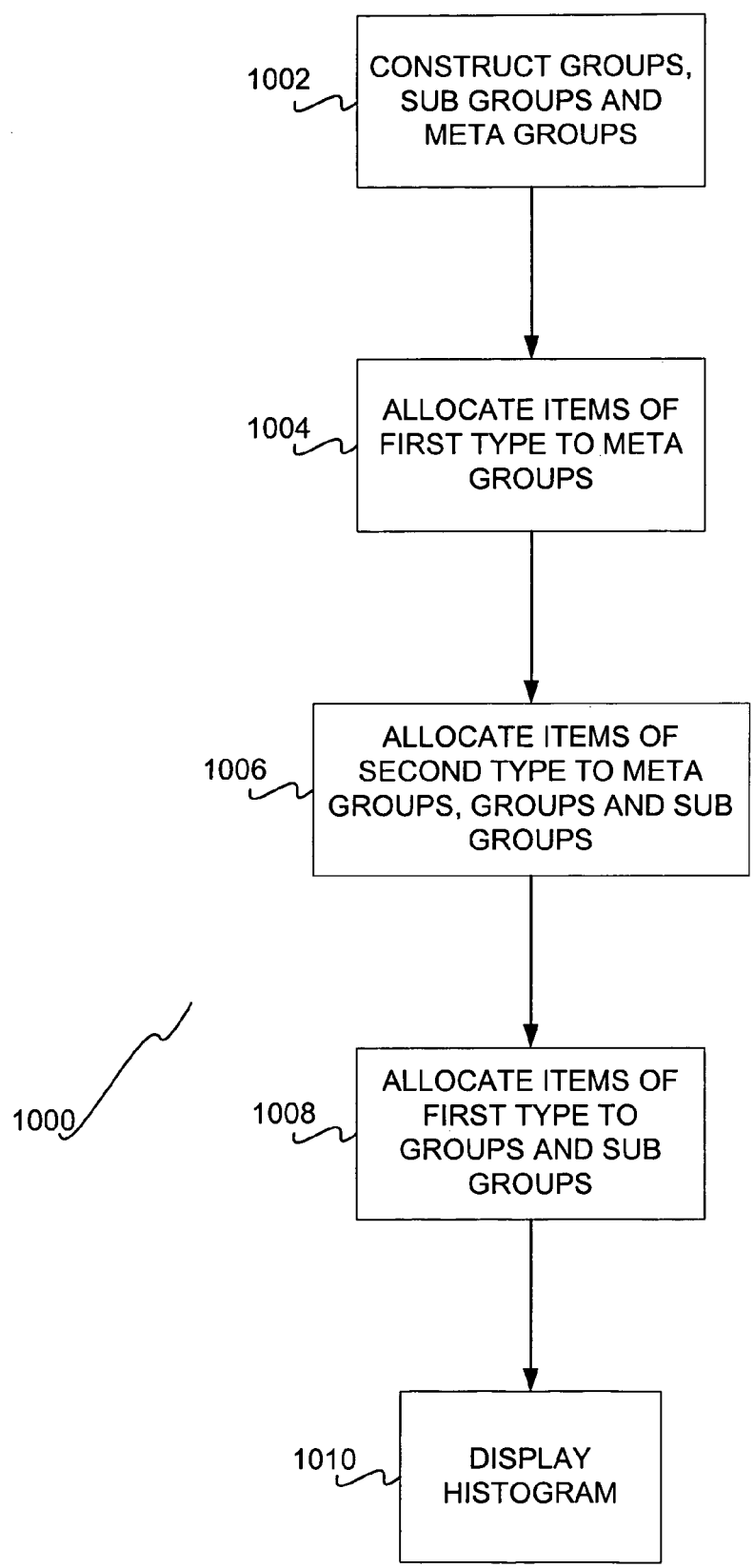

INVENTORY MANAGEMENT

FIELD OF THE INVENTION

This invention relates generally to the management of inventory of items, and more specifically to the management of banner ad inventory for displaying on web sites.

BACKGROUND OF THE INVENTION

The Internet has become a popular advertising medium. When users browse the world-wide-web, for instance, banner and other ads are a mainstay of many different web sites. Some of these web sites, usually the larger ones, handle their own placement of ads on their pages. However, many other web sites allow a third party to determine which ads should adorn their sites, in exchange for credits to display their own ads on others' web sites.

This is typically accomplished as follows. When a user visits a page of a web site, the web site returns a web document which contains instructions to the web client to obtain and display an ad from a third part server. The third party server attempts to match predetermined characteristics of the web site, and also potentially characteristics of the user visiting the site, with similar predetermined characteristics of an ad of an advertiser. The server then instructs the web client where to find the ad. For example, the server may pass on a link to the web site that the site can return to the user's browser, where the link is to an image for the ad that the server has determined should be displayed on the site.

This process provides for targeted advertising. A web site about sports, for example, may prefer advertising about sports. Thus, ads that have characteristics indicating sports will desirably be matched for display on the web site. Targeted advertising allows for a premium to be charged to advertisers over untargeted advertising, because presumably the users viewing the ad are a priori more interested in the subject matter being advertised. For example, a user visiting a sports-oriented web site is more likely to be receptive to sports-oriented ads, as opposed to a user visiting a bridal-oriented web site.

A difficulty with targeted advertising on web sites is that the third parties responsible for serving the ads to various web sites must constantly manage a large amount of inventory. That is, the third parties typically have a large number of web sites with various characteristics that require matching to a large number of banner ads with various characteristics. Salespeople for the third parties must be able to know at a given time the types of web sites that have space available for showing ads, so that they can sell this available inventory to advertisers desiring to advertise on these types of web sites. Inventory management also becomes more difficult for cooperative-based advertising. That is, some third parties, besides selling space on web sites to advertisers, also allow the operators of these web sites to show their own ads on others' web sites. For these and other reasons, therefore, there is a need for the present invention.

SUMMARY OF THE INVENTION

The present invention relates to inventory management of items, such as banner ads on web sites. In one embodiment, a method first constructs a number of item slot groups and a number of meta item slot groups. Each item slot group has a number of item slots, where each slot is initially unfilled and is able to be filled by an item. Each meta group encompasses one or more item slot groups, and has a number of item slots equal to the total number of item slots of its constituent groups. For example, an item slot may be an available space on a web site that is able to display an ad.

The method allocates each of a number of items of a first type over the item slots of the meta groups that are unfilled, by matching characteristics of the item to characteristics of the meta groups. For example, an item may be a banner ad, while an item of the first type may be a banner ad of a member of an advertising cooperative that is able to advertise on other web sites in exchange for allowing ads on its web site. The method next allocates each of a number of items of a second type over both the item slots of the meta groups as well as the groups that are unfilled, again by matching characteristics of the item to characteristics of the groups. For example, an item of the second type may be a banner ad of a sponsor that pays to advertise on web sites.

As an example, a meta group may be sports-related web sites, while its constituent groups may be baseball-related web sites and football-related web sites. There may be one hundred available baseball-related ad slots, but only five available football-related ad slots. Ads of members may be only allowed to specify that they be advertised on sports-related web sites, while ads of sponsors may be allowed to specify that they be advertised on football-related slots specifically. Allocating the ads of the members only against the meta group ensures that slots on specific web site types remain open for paying sponsors. For example, there may be one-hundred member ads that specify sports-related sites, while five sponsor ads that specify football-related sites in particular. By allocating the member ads against the meta group of sports, while allocating the sponsor ads against the group of football, this ensures that sponsors' ads are still able to be allocated to football-related sites particularly, even after the members' ads have been allocated to sports-related sites—in the case of this example, for instance, the member ads will be allocated to the baseball sites.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
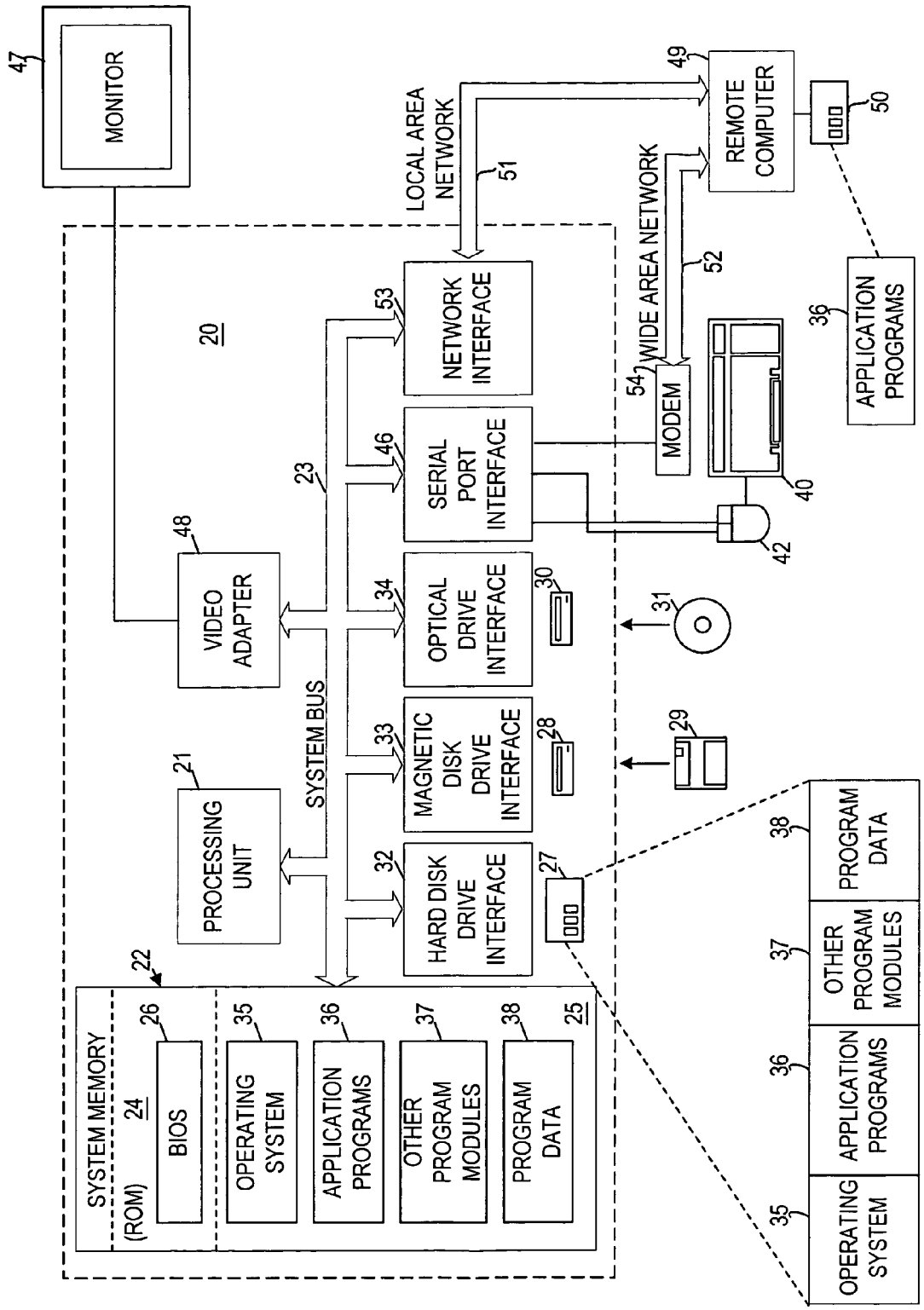
FIG. 1 is a diagram of a representative operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Sites and Targeted Advertising Thereon

In this section of the detailed description, an overview is provided of sites and targeted advertising thereon. A site as used herein is divided into at least a number of pages, such that the site is able to display an ad on one or more of the pages. Each page can include text, graphics, as well as links to other pages, both within and without the site.

The site can be a web site, accessible on the world-wide-web of the Internet via a Uniform Resource Locator (URL) address, such as http://www.mypage.com/index. However, the invention itself is not limited to sites that are web sites divided into web pages. Rather, the invention is applicable to other current and future network technologies that are accessible via sites divided into segments that are referred to herein as pages. As a non-restrictive example, intranets and extranets are amenable to embodiments of the invention.

The world-wide-web is referred to in shorthand as the Web, and is an Internet facility that links documents locally and remotely. A web document is called a web page, and links in the page let users jump from page to page (hypertext) whether the pages are stored on the same server or on servers around the world. The pages are generally accessed and read via a web browser computer program. Web pages are maintained at web sites, which are computers that support the Web's HyperText Transport Protocol (HTTP). When a web site is accessed, its home page is usually first viewed, which is an HTML document that serves as an index, or springboard, to the site's contents.

Figure 2:
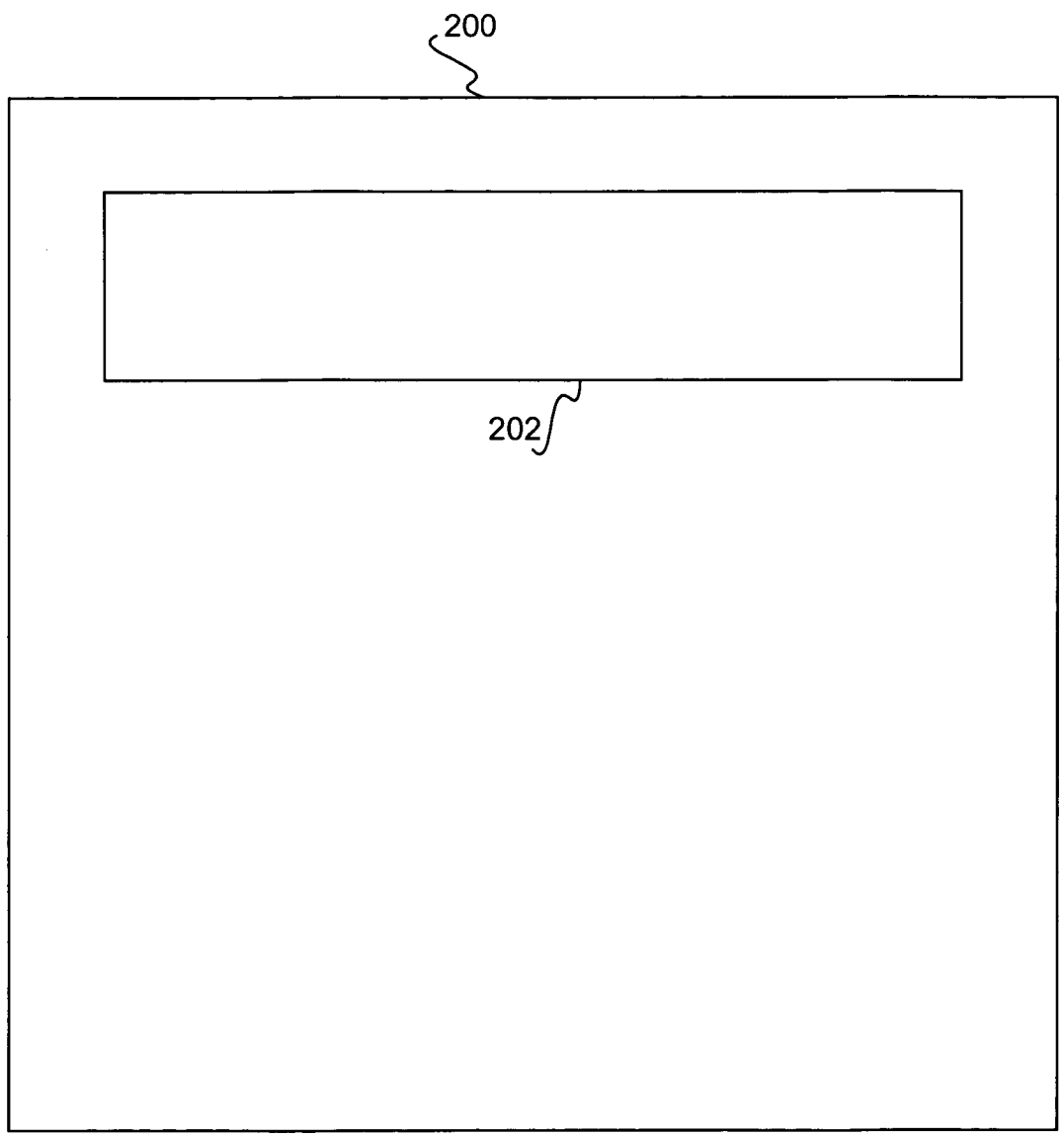
FIG. 2 is a diagram illustrating a representative web site and banner ad in conjunction with which embodiments of the invention may be practiced.

An example page of a site, such as a web page of a web site, on which targeted advertising can occur is shown in the diagram of FIG. 2. The web page 200 is part of a web site. On the web page 200 is shown a particular type of ad, a banner ad 202. A banner ad is generally referred to as an advertisement that spans the majority of the width of a web page, and is usually located at the top or the bottom of the page. Other types of ads include email ads, html ads, rich media ads (including sound/animation).

When a user requests the display of the web page 200 on his or her computer, the client (e.g., a browser program) of the user submits a request to a server for a targeted ad to be displayed. Characteristics of the web site, along optionally with characteristics of the user, are matched with characteristics of ads for advertisers and other web sites. Once an appropriate ad is determined, a link to an image of the ad located on another server is returned. The actual image can also be returned. The ad 202 that should be displayed on the page 200 is thus indicated.

The ads shown on pages of sites are desirably targeted to the sites as well as a optionally to the visitors (users) of those sites. Targeted advertising generally refers to providing advertisements intended for a specific audience. For example, sports-oriented web sites are intended for sports-interested users, such that ads targeting these sites will be those that are also sports-oriented, or those that are believed to be more interested in the subject matter of the ads than the general population as a whole. An example of the latter may be ads for big-screen televisions. While such ads are not sports-oriented per se, sports-oriented users may be more interested in such ads because many purchasers of big-screen televisions purchase them for viewing sports events such as football, baseball and basketball games.

First Operative Example

Embodiments of the invention are described in this and the next two sections of the detailed description by way of operative examples. Embodiments of the invention provide for the management of inventory, such as banner ads on web sites as has been described in the previous section of the detailed description. The operative examples specifically are sometimes described in the context of items that are such ads, and item slots that are available space on web sites for the showing of such ads. However, the invention itself is not so limited. That is, embodiments of the invention are applicable to any type of item that can be allocated to any type of item slots, as can be appreciated by those of ordinary skill within the art.

Figure 3:
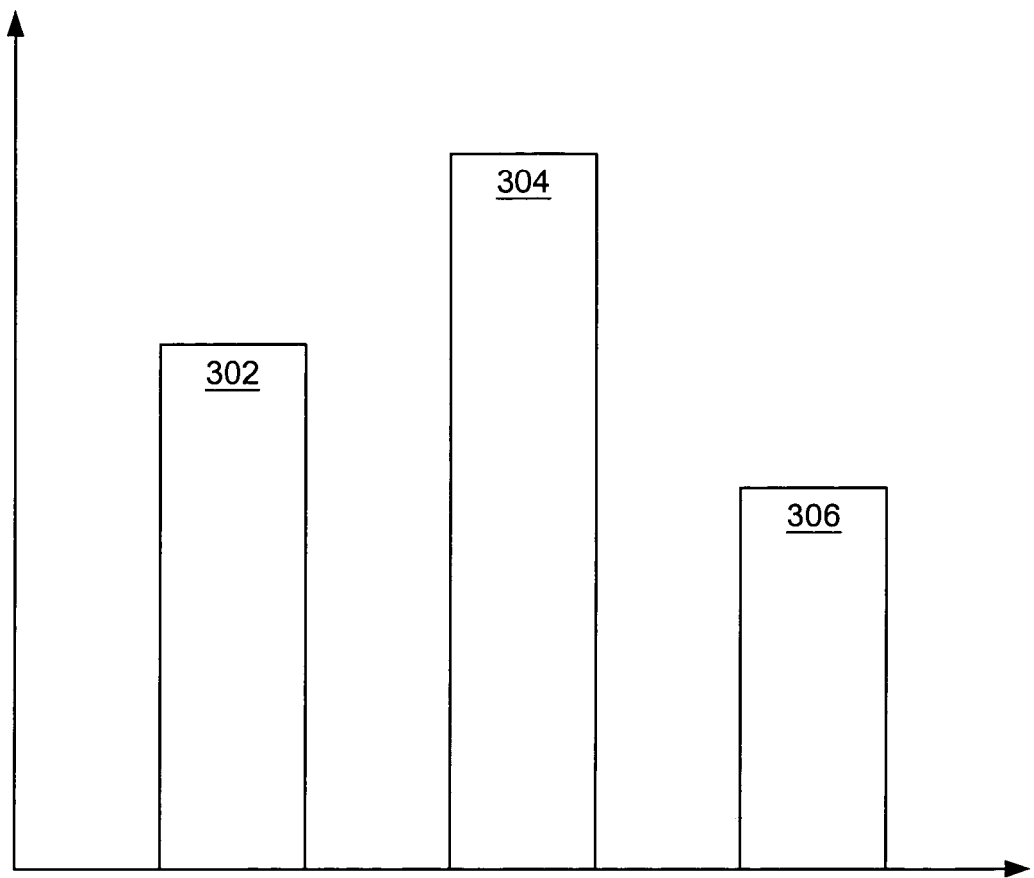
FIGS. 3–4 are histograms for reference thereto in conjunction with the description of a first operative example of an embodiment of the invention.

Referring to FIG. 3, a histogram 300 is shown having a first bar 302, a second bar 304, and a third bar 306. Each of the bars 302, 304 and 306 of the histogram 300 correspond to a group of item slots that has common characteristics by which they can be allocated to specific items on the basis of these characteristics matching characteristics of the items. For example, bar 302 could correspond to slots on baseball-related web sites that are available for displaying banner ads, bar 304 could correspond to slots on football-related web sites that are available for displaying banner ads, and bar 306 could correspond to slots on video game-related web sites that are available for displaying banner ads.

The height of each bar of the histogram 300 corresponds to the number of slots in the group to which the bar corresponds. Thus, the bar 302, since it is lower than the bar 304, corresponds to a group that has less slots available than does the group corresponding to the group 304. Similarly, since the bar 302 is higher than the bar 306, it corresponds to a group that has more slots available for items that does the group corresponding to the group 306. Each slot of a group is thus said to be initially unfilled; when an item is allocated to the group, it is said to have been filled by that item.

In one embodiment of the invention, ads of a first type are first each allocated over the item slots of the item slot groups that are unfilled, by matching characteristics of the item to characteristics of the item slot groups. Ads of this first type can correspond, for example, to member ads, where members are allowed to show ads of their own on other web sites for allowing ads to be shown on their web site. For example, a member that shows two ads on its web site can be entitled to show one of its own ads on other web sites.

As an example, there may be one hundred ads of the first type that have the characteristic of desiring to be shown on sports-related web sites, while there may be ten ads of the first type that have the characteristic of desiring to be shown on video game-related sites. The number of times a given ad is to be allocated to empty slots is said to be the quota for that ad. Thus, the former ads may actually only be one ad that is desired to be shown one-hundred times, while the latter ads may also actually only be one ad that is desired to be shown ten times. Furthermore, the number of unfilled slots represented by the bars 302, 304 and 306 as an example could correspond to seventy, eighty, and sixty, respectively. The one hundred ads to be shown on sports-related web sites thus could be shown (i.e., allocated) to either the baseball-related group corresponding to the bar 302, or the football-related group corresponding to the bar 304 (assuming that the characteristics of such web sites are receptive to showing these ads).

In one embodiment, the ads are allocated over these groups proportionally. That is, since there are one-hundred fifty total sports-related slots available (adding the number represented by the bar 302 to the number represented by the bar 304), then a proportion of seventy over one-hundred fifty is allocated to the baseball-related group corresponding to the bar 302, since this group corresponds to $$\frac{70}{150}$$

of the available slots, while a proportion of eighty over one-hundred fifty is allocated to the football-related group corresponding to the bar 304, since this group corresponds to $$\frac{80}{150}$$

of the available slots. Thus, $$100 \times \frac{70}{150} = 47$$

of the hundred ads will be allocated to the group corresponding to the bar 302, while $$100 \times \frac{80}{150} = 53$$

of the ads will be allocated to the group corresponding to the bar 304. The ten ads desired to be shown on video game-related web sites would be allocated to the video game-related group corresponding to the bar 306 (again assuming that the characteristics of such web sites are receptive to showing these ads).

Therefore, after allocation of ads of the first type, the group corresponding to the bar 302 has 70−47=23 remaining unfilled slots, the group corresponding to the bar 304 has 80−53=27 remaining unfilled slots, and the group corresponding to the bar 306 has 60−10=50 remaining unfilled slots. This is shown in the histogram 400 of FIG. 4, where the shaded portions of the bars 302, 304 and 306 represent the filled slots of the groups corresponding to these bars, while the unshaded portions of the bars represents the remaining unfilled slots of their corresponding groups.

Next, items of a second type are allocated over the item slots of the item slot groups that are unfilled, again by matching characteristics of the item to the characteristics of the groups. Ads of the second type can in one embodiment be ads of paying sponsors (that is, paying advertisers), which are allocated to empty web site ad spaces after members' ads are allocated. As an example, there may be ten ads of the second type that desire to be shown on baseball-related sites, and ten ads of the second type that desire to be shown on video game-related sites. (The "ten ads" may in fact be a single ad having a fill quota of ten, two ads having fill quotas of seven and three, etc., as can be appreciated by those of ordinary skill within the art.) In such an example, the former ads would be allocated to the group corresponding to the bar 302, which is able to accept the ads, since it has twenty-three unfilled slots. The latter ads would be allocated to the group corresponding to the bar 306, which is able to accept the ads, since it has fifty unfilled slots.

As motivation to the second operative example described in the next section of the detailed description, a shortcoming of the approach illustrated by this first operative example is revealed. Assuming that the first type ads have been allocated such that the remaining slots available are per the histogram 400 of FIG. 4, if an ad of the second type desires to be shown twenty-five times (i.e., has a quota of twenty five) on baseball-related sites (the group of which corresponds to the bar 302 of FIG. 4), this cannot be accommodated. The slots of the baseball-related group corresponding to the bar 302 have already been filled such that there are only twenty-three remaining unfilled slots.

However, it is noted that the baseball-related group corresponding to the bar 302 had earlier been filled by ads of the first type that did not specify particularly baseball-related slots, but only sports-related sites, such that the ads were allocated proportionally over the groups corresponding to the bars 302 and 304, where the latter group was football related. Thus, if some (specifically, two) of these ads previously allocated to the baseball-related group corresponding to the bar 302 had instead been allocated to the football-related group corresponding to the bar 304, there would have been sufficient unfilled slots to accommodate the twenty-five showings of the ad of the second type on baseball-related web sites. A solution to this shortcoming is therefore now described, as a second operative example.

Second Operative Example

In this section of the detailed description, a second operative example is described. As with the previous operative example, the second operative example is sometimes described in the context of items that are banner ads, and item slots that are available space on web sites for the showing of such ads. However, the invention itself is not so limited. That is, embodiments of the invention are applicable to any type of item that can be allocated to any type of item slots, as can be appreciated by those of ordinary skill within the art. The second operative example shows how an embodiment of the invention solves the shortcoming described at the end of the previous section of the detailed description.

Figure 4:
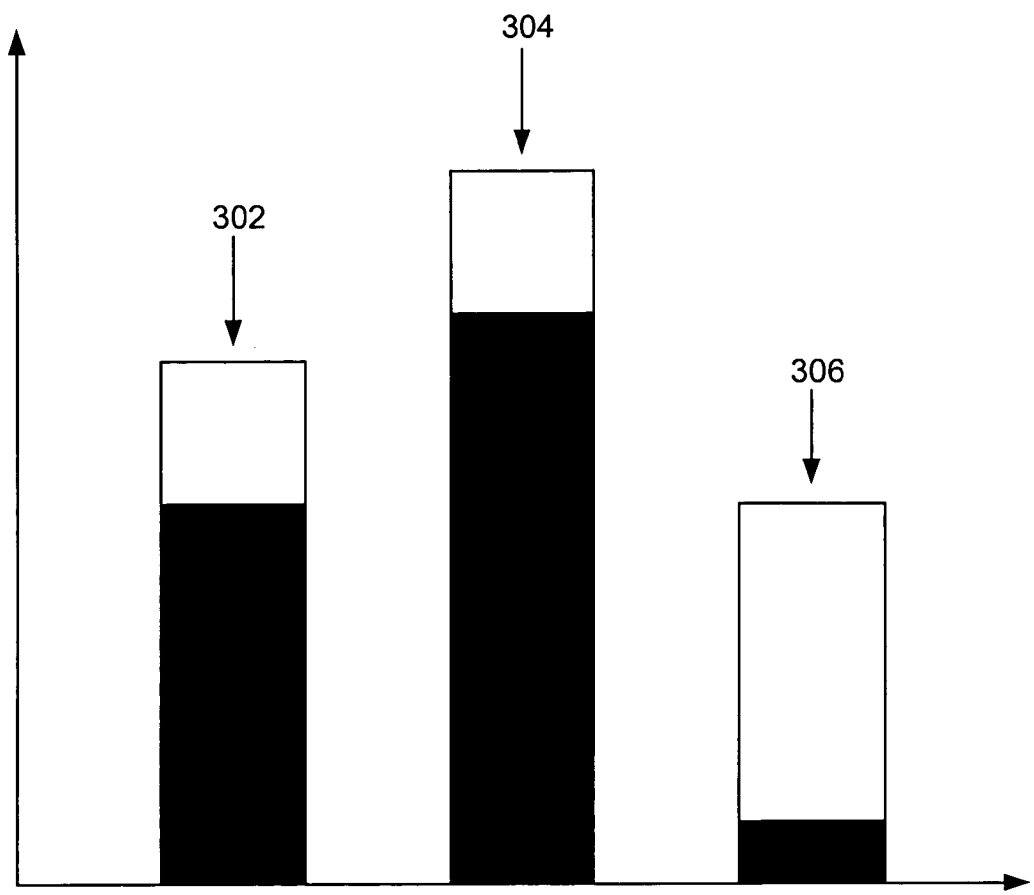
Figure 5:
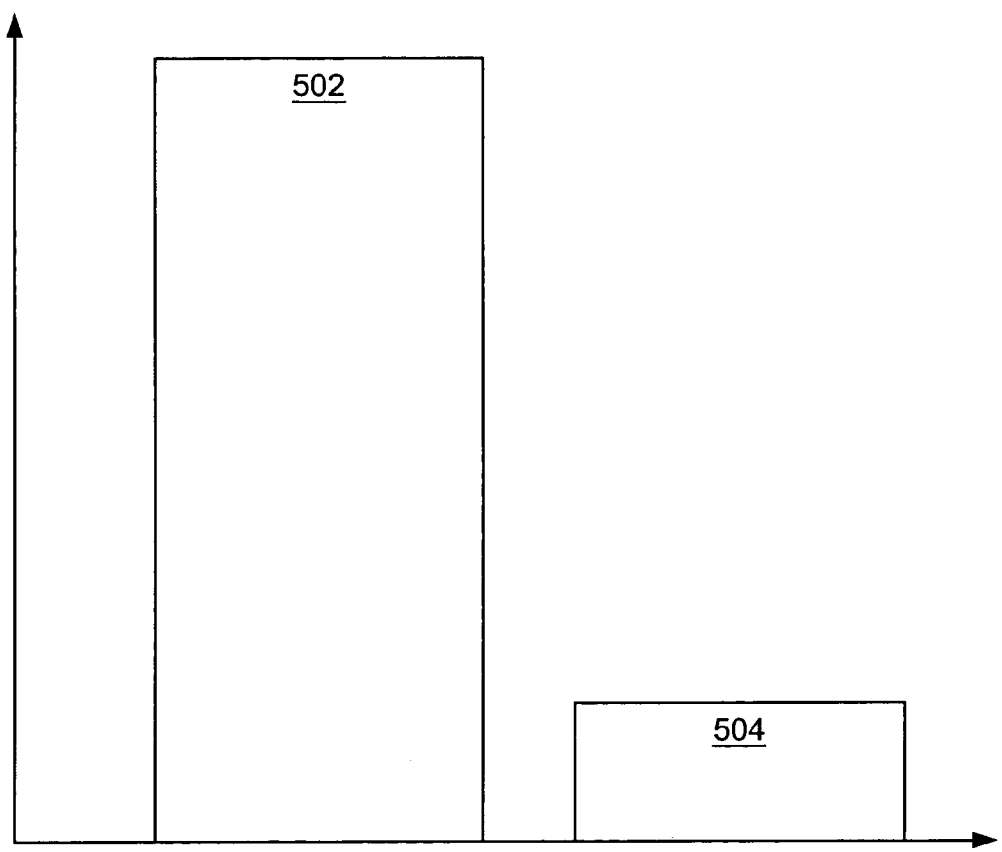
FIGS. 5–6 are histogram for reference thereto in conjunction with the description of a second operative example of an embodiment of the invention.

The second operative example uses the histograms 300 and 400 of FIGS. 3 and 4, respectively, but also an additional histogram 500 as shown in FIG. 5. The histogram 500 has a first bar 502 and a second bar 504. Each of the bars 502 and 504 of the histogram 500 corresponds to a meta group of item slots, where each meta group encompasses at least one item slot group, such as those to which bars 302, 304 and 306 of FIG. 3 correspond. For example, the first bar 502 could correspond to the meta group encompassing the groups to which the bars 302 and 304 of FIG. 3 correspond, while the second bar 504 could correspond to the meta group encompassing the group to which the bar 306 of FIG. 3 corresponds. In such an example, the first bar 502 could be said to correspond to sports-related web sites, since its constituent bars, the bars 302 and 304 correspond to baseball-related web sites and football-related web sites, respectively—i.e., both baseball and football are sports. The second bar 504 could be said to still correspond to video game-related web sites, since its only constituent bar, the bar 306, corresponds to video game-related web sites itself.

The height of each bar of the histogram 500 corresponds to the number of slots in the meta group to which the bar corresponds. Thus, the bar 502, since it is higher than the bar 504, corresponds to a meta group that has more slots available than does the meta group corresponding to the bar 504. Using the example of the previous section of the detailed description where the bar 302 corresponds to seventy unfilled item slots, the bar 304 to eighty unfilled item slots, and the bar 306 to sixty unfilled slots, in such an example the bar 502 of the histogram 500 would have one-hundred fifty empty slots (the addition of the empty slots of its constituent bars 302 and 304), while the bar 504 would have sixty unfilled slots. Each slot of a meta group thus corresponds to a slot of one of its constituent groups, such that the total number of slots of the meta group is equal to the slots of all its constituent groups. Each slot of a meta group is also said to be initially unfilled, and when an item is allocated to the meta group, it is said to have been filled by that item.

In one embodiment of the invention, ads of a first type are first each allocated over the item slots of the meta item slot groups that are unfilled, by matching characteristics of the item to common characteristics of the item slot groups encompassed by the meta item slot groups. Ads of this first type can correspond, for example, to member ads, where members are allowed to show ads of their own on other web sites in exchange for allowing ads to be shown on their web site. In one embodiment, such ads cannot target with as fine granularity as can ads of other types (such as of the second type, as will be described). For example, such ads can target sports-related sites, but could not specifically target football- or baseball-related web sites.

Using the example of the previous section of the detailed description, there may be one hundred ads of the first type that have the characteristic of desiring to be shown on sports-related web sites, while there may be ten ads of the first type that have the characteristic of desiring to be shown on video game-related sites. The number of times a given ad is to be allocated to empty slots is said to be the quota for that ad. Thus, the former ads may actually only be one ad that is desired to be shown one-hundred times, while the latter ads may also actually only be one ad that is desired to be shown ten times. The former ads would thus be allocated to empty slots of the meta group represented by the bar 502, while the latter ads would be allocated to empty slots of the meta group represented by the bar 504. This is specifically shown in the histogram 600 of FIG. 6, where the bar 502 is shown as two-thirds filled (the shaded portion of the bar corresponding to filled slots, and the unshaded portion corresponding to unfilled slots), since one-hundred slots of the one-hundred fifty slots of the meta group to which the bar 502 corresponds have been filled. The bar 504 is shown as one-sixth filled, since ten slots of the sixty slots of the meta group to which the bar 504 corresponds have been filled.

It is noted that allocation of ads (i.e., items) to slots of meta groups fills the slots of the meta groups, and also fills corresponding slots of the groups which the meta groups encompass. However, the particular group of a meta group that has its slot filled when a slot of the meta group is not specified with the allocation of the first type of ads. Thus, allocating an ad to an empty slot of the meta group represented by the bar 502 means that an empty slot of either the baseball-related group represented by the bar 302 of FIG. 3 or the football-related group represented by the bar 304 of FIG. 3 is also allocated—however, allocation of the ad to an empty slot of this meta group does not specify which of the groups—the baseball-related group or the football-related group—has a slot thereof allocated. That is, the allocation of ads of the first type results in the histogram 600 of FIG. 6, but does not result in the histogram 400 of FIG. 4—the allocation specifies only that slots of the meta group have been filled, and not particularly which slots of the groups which the meta group encompasses have been filled. Of course, in a situation where a meta group has only one constituent group, such as the meta group represented by the bar 504 encompassing only the group represented by the bar 306 of FIG. 3, the allocation of a slot of the meta group necessarily allocates a slot of the only group encompassed by this meta group.

This ambiguity in allocation of items to empty item slots of meta item slot groups allows for flexibility when allocating items of the second type, as is now described. As before, the ads of the second type can in one embodiment be ads of paying sponsors, or advertisers, that are allocated to empty web site ad space after members' ads are allocated. Unlike ads of the first type, however, ads of the second type can be specified with greater particularity as to the type of web sites on which they are to be shown. Thus, whereas ads of the first type can only specify sports-related web sites, ads of the second type can specify particularly baseball-related or football-related web sites. The ads of the second type are allocated over both the item slots of the meta item slot groups that are unfilled, as well as the item slots of the item slot groups that are unfilled, by matching characteristics of the items to characteristics of the item slot groups.

Thus, assuming allocation of ads of the first type as has been described, the shortcoming of the previous section of the detailed description is solved as is now described. Assume twenty-five ads of the second type that desire to be shown on baseball-related web sites. These are first allocated over the unfilled slots of the meta group to which the bar 502 of the histogram 600 of FIG. 6 corresponds. Because there are fifty slots free in the meta group to which the bar 502 corresponds, potentially there are enough baseball-related web site slots open. Next, the twenty-five ads are allocated over the unfilled slots of the baseball-related group to which the bar 302 of FIG. 3 corresponds. Because the slots of the bar 302 have not yet been specifically allocated among the ads of the first type, they can be allocated by the ads of the second type.

Figure 6:
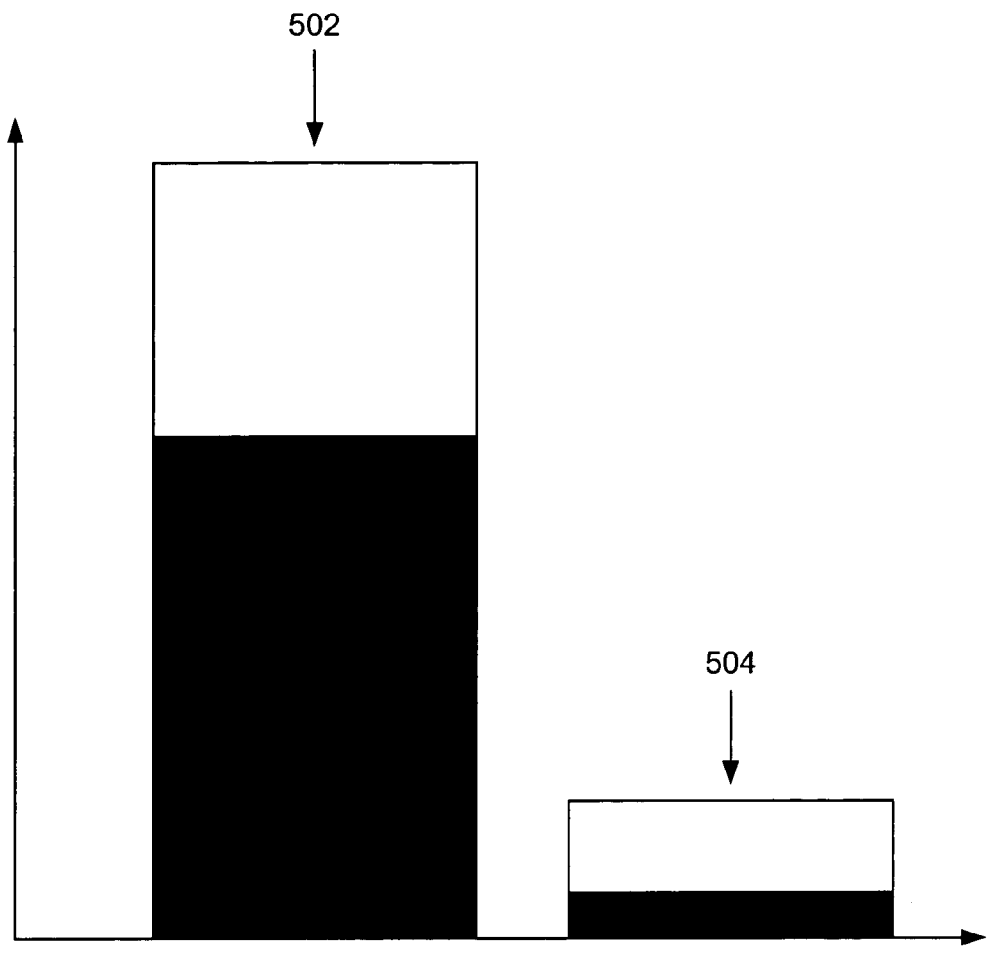

Therefore, that there will be enough sports-related slots (i.e., slots of the groups corresponding to the bars 302 and 304 of FIG. 3) left over for the ads of the first type is ensured by the histogram 600 of FIG. 6—as long as ads of the second type are not over-allocated to the sports-related meta group to which the bar 502 corresponds, the specific allocation of ads of the first type to the slots of the football-related and baseball-related groups that the sports-related meta group encompasses can be performed after the ads of the second type have been allocated to these slots particularly. That is, allocation of ads of the first type is performed initially only over the meta groups, so it is ensured that they are shown. The allocation of ads of the second type is then performed—they are allocated over the meta groups to ensure that there is specific room for them, and once this verification has been made, they can then be allocated over the particular groups as appropriate and necessary. Once the allocation of ads of the second type has been made over the item slots of the groups and the meta groups, then the ads of the first type can be allocated over the item slots of the groups specifically, as room has been left after allocation of ads of the second type.

Thus, the second operative example shows how the shortcoming described in the previous section of the detailed description is solved. The twenty-five baseball-related ads of the second type are allocated to the sports-related meta group, after the one-hundred sports-related ads of the first type have been allocated to the sports-related meta group (but not specifically either to the baseball-related or the football-related group yet). Then twenty-five baseball-related ads of the second type are then allocated to the baseball-related group—unlike in the first operative example, there is sufficient number of empty slots within the baseball-related group to accommodate the these ads, since no ads of the first type have yet been allocated to the baseball-related group. Finally, the sports-related ads are allocated to the empty slots of the constituent groups of the sports-related meta group—the baseball-related group and the football-related group—such as can be performed proportionally; as has been described.

Third Operative Example

The previous two sections of the detailed description described item slot groups and meta item slot groups, respectively. By comparison, in this section of the detailed description sub item slot groups are described. As with the previous operative examples, the third operative example is sometimes described in the context of items that are banner ads, and item slots that are available space on web sites for the showing of such ads. However the invention is not itself so limited. Thus, embodiments of the invention are applicable to any type of item that can be allocated to any type of item slots, as can be appreciated by those of ordinary skill within the art.

Figure 7:
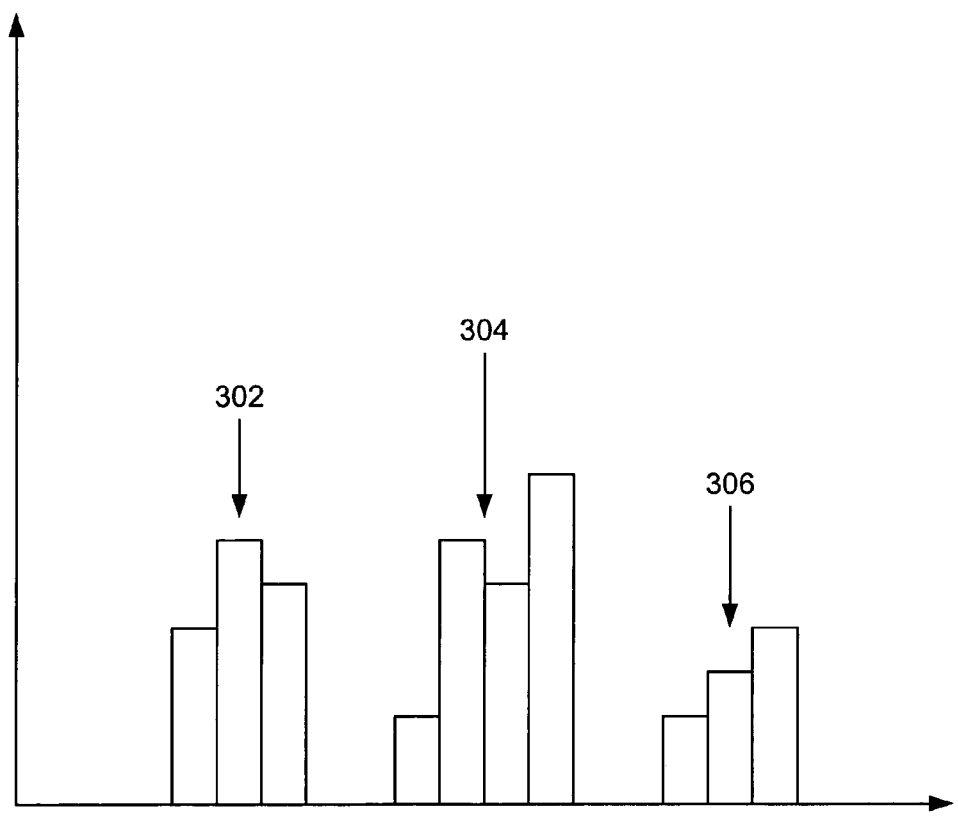
FIG. 7 is a histogram for reference thereto in conjunction with the description of a third operative example of an embodiment of the invention; and, FIGS. 8–10 are flowcharts of methods according to varying embodiments of the invention.
Figure 7:

Referring to FIG. 7, a histogram 700 having bars 302, 304 and 306 is shown. That is, these bars are the same as the bars of the histogram 300 of FIG. 3. However, in FIG. 7, each bar is divided into sub-bars. Each sub-bar corresponds to a sub item slot group encompassed by the group to which the bar of the sub-bar corresponds. In one embodiment, each sub item slot group corresponds to a different type of user that frequents the type of web site to which the group of the sub item slot group corresponds. For example, where the bar 302 corresponds to baseball-related web sites, the sub-bars of the bar 302 could correspond to North American visitors of such web sites, European visitors of such web sites, and Southeast Asian visitors of such web sites. Similar correspondence may also hold for the bars 304 and 306 of the histogram 700 of FIG. 7, as can be appreciated by those of ordinary skill within the art.

As with meta groups and groups, where ads of the first type can only specify meta groups while ads of the second type can specify groups (i.e., the ads of the second type have finer granularity), ads of the first type can only specify groups while ads of the second type can specify sub groups. Thus, this could correspond to the situation where member ads can be placed particularly only at the meta group level, while sponsor ads can be placed particularly at the sub group, group, and meta group levels. That is, for example, sponsor ads could specify that they be shown on baseball-related web sites viewed by European visitors, while member ads could only specify that they be shown on sports-related web sites, and not particularly specify the type of visitors or the type of sports.

In one embodiment, therefore, allocation of ads to groups, meta groups, and sub groups is accomplished similar to the allocation of ads to groups and meta groups as described in the previous section of the detailed description. That is, items of the first type are allocated over only the meta item slot groups. Then, items of the second type are allocated over the meta item slot groups, the groups and the sub groups. Thereafter, items of the first type are allocated over the groups and the sub groups. The initial allocation of ads of the first type to the meta groups ensures that there will be slots available for those ads when they are later allocated to particular groups and sub groups. However, ads of the second type are allocated to groups and sub groups prior to ads of the first type to ensure that ads of the second type have the first opportunity to particularly specify the type of web site and the type of user frequenting a type of web site, prior to the ads of the first type being allocated to sub groups and groups. Thus, allocation of ads of the first type to meta groups ensures that ads of the first type are always shown on web sites where space is available. Where more than sufficient space is available to show ads of the first type, then ads of the second type are allocated as space allows to particular groups and sub groups. Only then are the ads of the first type allocated to particular groups and sub groups.

Methods

In this section of the detailed description, methods to achieve the operative examples of the previous three sections of the detailed description are described. It is noted that these methods can be computer-implemented in some embodiments. Furthermore, the methods can be realized at least in part as one or more programs, or parts thereof, each having a number of instructions, running on a computer or other such device—that is, as a program executed from a machine- or a computer-readable medium such as a memory by a processor of a computer of FIG. 1 as has been described, or other such device. The programs are desirably storable on a machine-readable medium such as a compact flash memory, floppy disk or a CD-ROM, for distribution and installation and execution on another computer.

Figure 8:
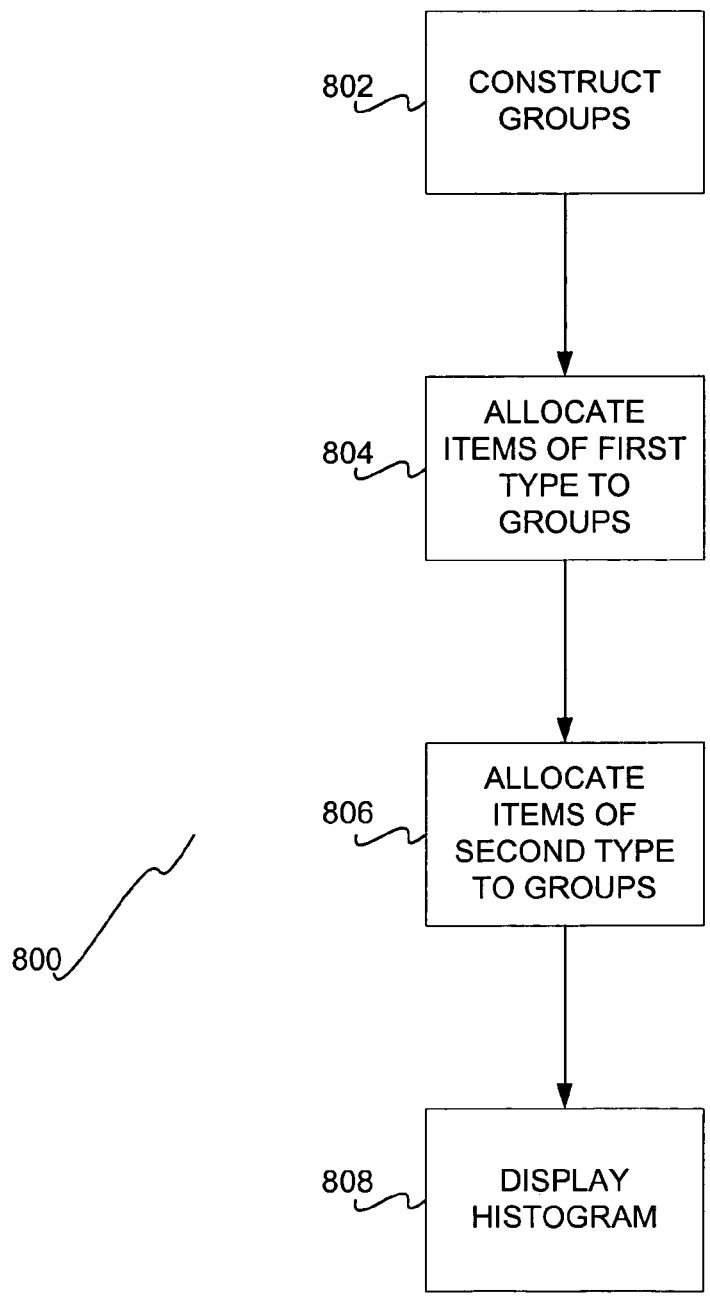

Referring first to FIG. 8, a flowchart 800 of a method according to an embodiment of the invention is shown, which can be performed to yield the first operative example as has been described. In 802, item slot groups are constructed, such that each group has a number of item slots. Each item slot is initially unfilled, and is able to be filled by an item. In 804, each of a number of items of a first type is allocated over the item slots of the item slot groups that are unfilled. In one embodiment, this is accomplished by matching characteristics of the item to characteristics of the item slot groups. Thus, allocating an item to an item slot fills the item slot with the item. An item can have a fill quota in one embodiment, such that allocating the item over the item slots means filling a number of such slots that are unfilled with the item, equal to the quota. In one embodiment, too, the allocation in 804 can be proportional as has been described.

In 806, each of a number of items of a second type is allocated over the item slots of the item slot groups that remain unfilled. In one embodiment, this is again accomplished by matching characteristics of the item to characteristics of the groups, such that allocating an item to a slot fills the slot with the item. Items of the second type can also have fill quotas. Finally, in 808, the slot groups can be displayed as a histogram with a number of bars, where each bar corresponds to a group, and has a height corresponding to the number of slots of the group. Desirably, the bar has indication as to how many of the slots are filled and how many are unfilled. For example, a line could separate the filled from the unfilled slots in one embodiment, while in another embodiment, the portion of the groups' slots that is filled is represented as shaded or in one particular color, while the portion of the groups' slots that is unfilled is represented as not shaded or in another particular color. The invention is not limited to a particular manner of such indication, however, as can be appreciated by those of ordinary skill within the art.

As can be appreciated by those of ordinary skill within the art as well, the characteristics of the items and the characteristics of the groups (and, meta groups and sub groups) by which items are matched to groups, meta groups and sub groups, are not limited by the invention. In one embodiment, the characteristics of the groups include information regarding web sites to which the groups correspond. In one embodiment, the information for is one or more of the following: an account type, such as whether the site is a member site or a paying site, where the former is a site that has its own ads displayed on other sites by trading space on its pages for display of the ads of other sites, and the latter is a site that pays to have its ads displayed on the pages of other sites; the size of the space on the pages of the site allotted for ads (e.g., banner-size, small-size, large-size, etc.); the language of the site (English, French, Italian, etc.); whether the site accepts ads that have animations thereon, or whether the site only accepts static ads; the rating of the site, where, for instance, 1 may correspond to a "G" rating, 2 may correspond to a "PG" rating, 3 may correspond to a "PG-13" rating, and 4 may correspond to an "R" rating; the rating of allowed ads to be displayed on the site, also from 1–4; whether the site is commercial or non-commercial; whether only commercial ads, non-commercial ads, or both, are allowed on the site; up to a predetermined number of categories by which the site can be classified, according to any scheme in which subject matters are assigned a number, and where hierarchies of subject matters up to a predetermined number of levels can also exist; up to a predetermined number of categories of ads that the site does not accept for display thereon; a list of individual other accounts not allowed to advertise on the site (e.g., such as ads for competitors); a geographic identifier for the site; and, the type of domain of the site (e.g., .edu, .com, .net, etc.).

Similarly, in one embodiment, where the items are ads, the characteristics for the items include information regarding ads. In one embodiment, the information is one or more of the following: an account type, such as whether the advertiser is a member site or a paying advertiser, where the former is a site that has its own ads displayed on other sites by trading space on its pages for display of the ads of other sites, and the latter pays to have its ads displayed on the pages of sites; the size of the ad (e.g., banner-size, small-size, large-size, etc.); the language of the ad (English, French, Italian, etc.); whether ad has animations thereon, or whether the ad is static; the rating of the ad, where, for instance, 1 may correspond to a "G" rating, 2 may correspond to a "PG" rating, 3 may correspond to a "PG-13" rating, and 4 may correspond to an "R" rating; the rating of allowed sites on which the ad can be displayed, also from 1–4; whether the ad is commercial or non-commercial; whether only commercial sites, non-commercial sites, or both, are allowed for the display of the ad; up to a predetermined number of categories by which the ad can be classified, according to any scheme in which subject matters are assigned a number, and where hierarchies of subject matters up to a predetermined number of levels can also exist; the type of browser that the ad is targeting, if any; the type of operating system that the ad is targeting, if any; the day of the week and/or the hour of the day that the ad is to be displayed in; the site domain the ad is targeting (.edu, .com, .net, etc.); the user domain the ad is targeting (.edu, .com, .net, etc.); an identifier regarding the geographic region in which the ad is to be displayed; and, any site key words that the ad is targeting.

Figure 9:
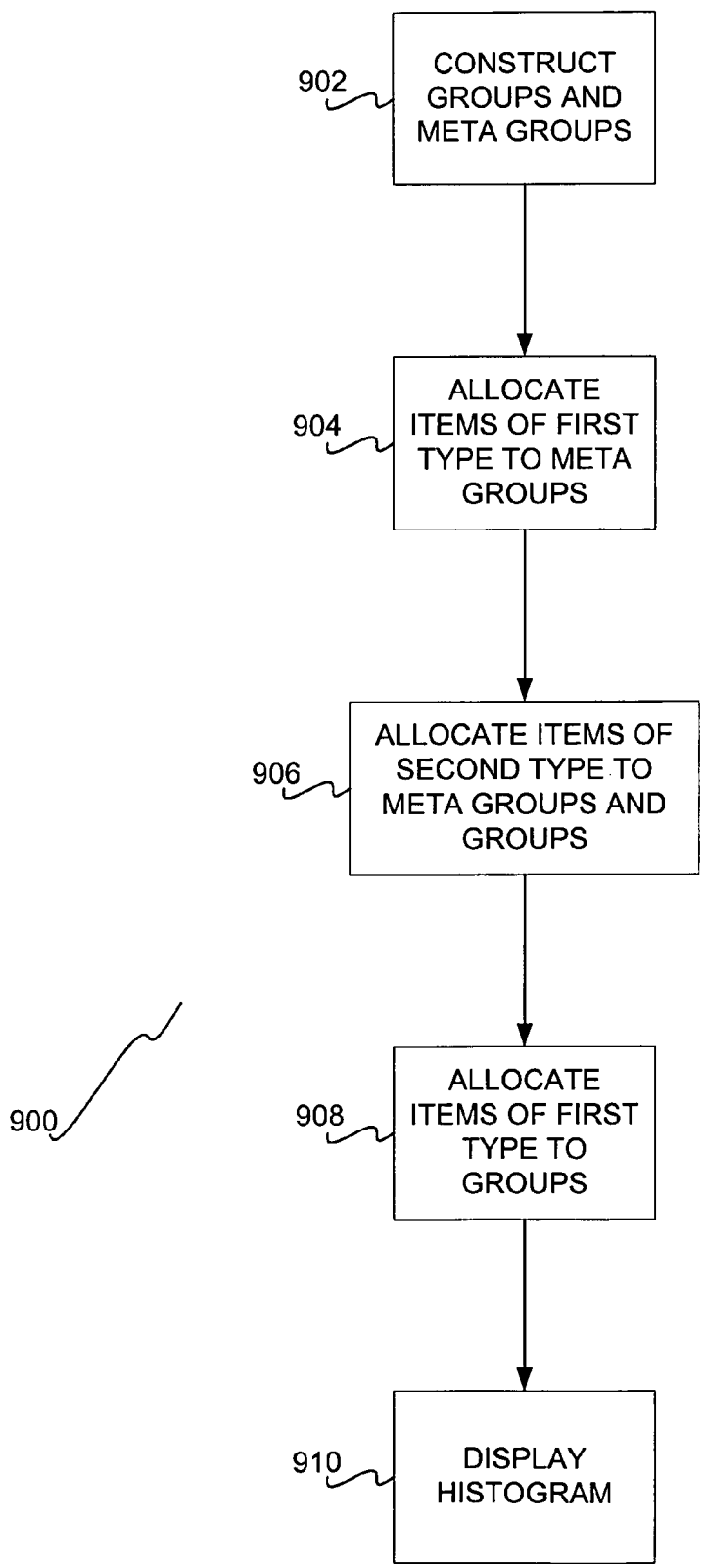

Referring next to FIG. 9, a flowchart 900 of a method according to an embodiment of the invention is shown, which can be performed to yield the second operative example as has been described. In 902, item slot groups and meta item slot groups are constructed. Each group has a number of slots, where each slot is initially unfilled and able to be filled by an item. Each meta group encompasses one or more item slot groups, and has a number of item slots equal to the total number of item slots of its constituent groups. In 904, each of a number of items of a first type is allocated over the item slots of the meta item slot groups that are unfilled, by matching characteristics of the item to characteristics of the meta groups. Thus, allocating an item to a slot fills the slot with the item. Items can have fill quotas, as has been described. In 906, each of a number of items of a second type is allocated over both the slots of the meta groups and the groups that remain unfilled, by matching characteristics of the item to characteristics of the groups. These items can also have fill quotas. In 908, the items of the first type are allocated over the item slots of the groups that are unfilled.

Finally, in 910, in one embodiment, two histograms can be displayed. In a first histogram, such as the histogram 300 of FIG. 3 as has been described, each bar of the histogram corresponds to an item slot group, and has a height corresponding to the number of item slots of the group. As has been described, each bar has indication as to the number of item slots that are filled, and the number that are unfilled, although the invention is not particularly limited to a given manner of so indicating. In a second histogram, such as the histogram 500 of FIG. 5 as has been described, each bar of the histogram corresponds to a meta item slot group, and also has a height corresponding to the number of item slots of the meta group. Each of these bars as well can have indication as to the number of item slots that are filled and the number that are unfilled, although the invention is not particularly limited to a given manner of so indication.

Finally referring to FIG. 10, a flowchart 1000 of a method according to an embodiment of the invention is shown, which can be performed to yield the third operative example as has been described. In 1002, sub item slot groups, item slot groups, and meta item slot groups are constructed. Each sub group has a number of item slots, where each slot is initially unfilled and able to be filled by an item. Each group encompasses at least one sub item slot group and has a number of slots equal to the total number of slots of its constituent sub groups. Each meta group encompasses at least one group and has a number of slots equal to the total number of slots of its constituent groups.

In 1004, each of a number of items of a first type are allocated over the slots of the meta groups that are unfilled, by matching characteristics of the item to characteristics of the groups. Allocating an item to a slot thus fills the slot with the item. Items of this first type, as well as items of a second type, can have fill quotas as has been described. In 1006, each of a number of items of the second type are allocated over the slots of the meta groups, the groups, and the sub groups that are unfilled, by matching characteristics of the items to characteristics of the sub groups. In 1008, items of the first type are then each allocated over the slots of the groups and the sub groups that are unfilled.

In 1010, two histograms are displayed in one embodiment. The first histogram has a number of sub-bars organized into a number of bars. Each sub-bar corresponds to a sub item slot group, and has a height corresponding to the number of item slots of the sub item slot group. Each sub-bar also has indication as to the number of item slots that are filled and the number that are unfilled, as has been described. The second histogram has a number of bars, where each corresponds to a meta group, and has a height corresponding to the number of slots of the meta group. Each bar also has indication as to the number of item slots that are filled and the number that are unfilled, as has been described.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computer-implemented method for allocating items to an available inventory of empty item slots, comprising the steps of:
   determining a number of item slots available in an inventory that are empty, such that each item slot that is empty can be filled by either an item of a first type having a corresponding characteristic or an item of a second type having a corresponding characteristic, and wherein each item slot that is empty is filled by only a single item having the corresponding characteristic;
   organizing the item slots that are empty into item slot groups, each different item slot group including only those item slots which can be filled by items having the same characteristic;
   allocating each of a plurality of items of the first type to the item slots of the item slot groups that are unfilled by matching characteristics of the first type of items to characteristics of the item slot groups, such that allocating an item of the first type to an item slot fills the item slot with the item;
   allocating each of a plurality of items of the second type to the item slots of the item slot groups that are unfilled by items of the first type by matching characteristics of the second type of items to the characteristics of the item slot groups, such that allocating an item of the second type to an item slot fills the item slot with the item; and
   displaying the plurality of item slot groups as a histogram having a plurality of bars, where each bar corresponds to an item slot group and has a height corresponding to the number of item slots of the item slot group, wherein the bar has an indication as to how many of the number of item slots of the item slot group are filled and how many of the number of item slots of the item slot group are unfilled.

2. The method of claim 1, wherein each item comprises an ad and each item slot group comprises a web site, such that each item slot of the item slot group corresponds to an advertising space on the web site on which an ad can be shown.

3. The method of claim 2, wherein the first type of the plurality of items comprises sponsor ads, and the second type of the plurality of items comprises member ads.

4. The method of claim 1, wherein each of the plurality of items of the first type has a fill quota, wherein allocating each of the plurality of the items of the first type comprises filling a number of item slots of the item slot groups that are unfilled with the item equal to the quota.

5. The method of claim 4, wherein allocating each of the plurality of the items of the first type further comprises filling the number of item slots of the item slot groups that are unfilled with the item equal to the quota proportionally as to the item slots unfilled of the item slot groups having characteristics matching the characteristics of the item.

6. The method of claim 1, wherein each of the plurality of items of the second type has a fill quota, wherein allocating each of the plurality of the items of the second type comprises filling a number of item slots of the item slot groups that are unfilled with the item equal to the quota.

7. The method of claim 6, wherein allocating each of the plurality of the items of the second type further comprises filling the number of item slots of the item slot groups that are unfilled with the item equal to the quota proportionally as to the item slots unfilled of the item slot groups having characteristics matching the characteristics of the item.

8. A computer-implemented method for allocating items to an available inventory of empty item slots, comprising the steps of:
   determining a number of item slots available in an inventory that are empty, such that each item slot that is empty can be filled by either an item of a first type having a corresponding meta characteristic and no group characteristic, or an item of a second type having both a corresponding meta characteristic and a corresponding group characteristic, and wherein each item slot that is empty is filled by only a single item having the corresponding characteristic;
   organizing the item slots that are empty into item slot groups, a different item slot group being constructed for each different group characteristic, such that each item slot that can be filled with an item having that group characteristic is included in that item slot group;
   constructing a meta item slot group for each different meta characteristic that can be used to fill the item slots, each meta item slot group having a number of meta item slots equal to a total number of item slots that can be filled by items having that meta characteristic, each meta item slot being initially unfilled and able to be filled by an item having that meta characteristic;
   allocating each of a plurality of items of a first type over the meta item slots of the meta item slot groups that are unfilled by matching meta characteristics of the first type of items to the meta item slots, such that the meta item slots are filled only by items of the first type having the same meta characteristic, and allocating an item of the first type to a meta item slot fills the meta item slot with the item;

allocating each of a plurality of items of a second type over the meta item slots of the meta item slot groups that are unfilled by items of the first type by matching characteristics of the second type of items to the characteristics of the meta item slot groups, such that the meta item slots are filled only by items of the second type having the same meta characteristic, and allocating an item of the second type to a meta item slot fills the meta item slot with the item, thereby determining a number of items of the second type required to fill all meta item slots unfilled by items of the first type;

for each item of the second type that is allocated to a meta item slot, also allocating that item of the second type to an item slot that is unfilled by matching characteristics of the item of the second type to the characteristics of the item slot groups, such that each item slot is filled only by items of the second type having the same group characteristic and the same meta characteristic, and allocating an item of the second type to an item slot fills the item slot with the item; and for each item of the first type that is allocated to a meta item slot, also allocating that item of the first type to an item slot that is unfilled by an item of the second type by matching characteristics of the first type of items to characteristics of the item slots, such that each item slot is filled only by items of the first type having the same meta characteristic, and allocating an item of the first type to an item slot fills the item slot with the item, thereby allocating items to an available inventory of empty item slots.

9. The method of claim 8, further comprising:

displaying the plurality of item slot groups as a first histogram having a plurality of bars, where each bar corresponds to an item slot group and has a height corresponding to the number of item slots of the item slot group, wherein the bar has an indication as to how many of the number of item slots of the item slot group are filled and how many of the number of item slots of the item slot group are unfilled; and, displaying the plurality of meta item slot groups as a second histogram having a plurality of bars, where each bar corresponds to a meta item slot group and has a height corresponding to the number of meta item slots of the meta item slot group, wherein the bar has an indication as to how many of the number of meta item slots of the meta item slot group are filled and how many of the number of meta item slots of the meta item slot group are unfilled.

10. The method of claim 8, wherein each item comprises an ad, each item slot group comprises a web site, and each meta item slot group comprises at least one web site having similar characteristics, such that each item slot of the item slot group corresponds to an advertising space on the web site on which an ad can be shown, and each meta item slot of the meta item slot group corresponds to an advertising space on a web site of the meta item slot group on which an ad can be shown.

11. The method of claim 10, wherein the first type of the plurality of items comprises member ads, and the second type of the plurality of items comprises sponsor ads.

12. The method of claim 8, wherein each of the plurality of the items of the first type and each of the plurality of the items of the second type has a fill quota, wherein allocating each of the plurality of the items comprises filling a number of item slots that are unfilled with the item equal to the quota.

13. A computer-implemented method for allocating items to an available inventory of empty item slots, comprising the steps of:

determining a number of item slots available in an inventory that are empty, such that each item slot that is empty can be filled by an item of a first type having a corresponding meta characteristic and no group characteristic, an item of a second type having a corresponding meta characteristic and a corresponding group characteristic, or an item having a corresponding meta characteristic, a corresponding group characteristic, and a corresponding sub group characteristic, and wherein each item slot that is empty will be filled by only a single item having the corresponding characteristics;

organizing the item slots that are empty into sub item slot groups, each item slot being initially unfilled and able to be filled by an item, such that each different sub item slot group includes only those item slots that can be filled by items having the same meta group, group, and sub group characteristics;

organizing the sub item slot groups into item slot groups, such that each different item slot group includes only those sub item slot groups whose item slots can be filled by items having the same meta and group characteristics;

constructing a meta item slot group for each different meta characteristic that can be used to fill an item slot, each meta item slot group having a number of meta item slots equal to a total number of item slots that can be filled by items having the same meta characteristic, each meta item slot being initially unfilled and able to be filled by an item having a corresponding meta characteristic, an item having a corresponding meta characteristic and a corresponding group characteristic, or an item having a corresponding meta characteristic, a corresponding group characteristic, and a corresponding sub group characteristic, and wherein a meta item slot that is empty is filled by only a single item having the corresponding characteristics;

allocating a plurality of items of a first type over the meta item slots of the meta item slot groups that are unfilled by matching meta characteristics of the first type of items to meta characteristics of the meta item slot groups, such that allocating an item to a meta item slot fills the meta item slot with the item;

allocating each of a plurality of items of a second type over the meta item slots of the meta item slot groups that are unfilled, the item slots of the item slot groups that are unfilled, and the item slots of the sub item slot groups that are unfilled, by matching characteristics of the second type of items to respective characteristics of the meta item slot groups, of the item slot groups, and of the sub item slot groups, such that allocating an item to an item slot fills the item slot with the item, and allocating an item to a meta item slot fills the meta item slot with the item; and, allocating each of a plurality of items of a second type over the meta item slots of the meta item slot groups that are unfilled by items of the first type, by matching meta characteristics, group characteristics, and sub group characteristics of the second type of items to respective characteristics of the meta item slots, such that allocating an item to an item slot fills the item slot with the item, thereby determining how many items of the second type are needed to fill the meta item slots unfilled by items of the first type;

for each item of the second type that is allocated to a meta item slot, also allocating that item of the second type to an item slot that is unfilled by matching meta, group, and sub group characteristics of the item of the second type to the meta, group, and sub group characteristics of the item slot, such that each item slot is filled only by items of the second type having the corresponding meta, group, and sub group characteristics, and allocating an item of the second type to an item slot fills the item slot with the item; and for each item of the first type that is allocated to a meta item slot, also allocating that item of the first type to an item slot that is unfilled by an item of the second type by matching meta characteristics of the first type of items to meta characteristics of the item slots, such that each item slot is filled only by items of the first type having the same meta characteristic, and allocating an item to an item slot fills the item slot with the item, thereby allocating items to an available inventory of empty item slots.

14. The method of claim 13, further comprising the steps of:

displaying the plurality of item slot groups as a first histogram having a plurality of sub-bars organized into a plurality of bars, where each sub-bar corresponds to a sub item slot group and has a height corresponding to the number of item slots of the sub item slot group, wherein the sub-bar has an indication as to how many of the number of item slots of the sub item slot group are filled and how many of the number of item slots of the sub item slot group are unfilled; and, displaying the plurality of meta item slot groups as a second histogram having a plurality of bars, where each bar corresponds to a meta item slot group and has a height corresponding to the number of meta item slots of the meta item slot group, wherein the bar has an indication as to how many of the number of meta item slots of the meta item slot group are filled and how many of the number of meta item slots of the meta item slot group are unfilled.

15. The method of claim 13, wherein each item comprises an ad, each item slot group comprises a web site, each sub item slot group comprises a viewer type of web site, and each meta item slot group comprises at least one web site having similar characteristics, such that each item slot of the sub item slot group corresponds to an advertising space on the web site on which an ad can be shown to a particular viewer type, each item slot of the item slot group corresponds to an advertising space on the web site on which an ad can be shown, and each meta item slot of the meta item slot group corresponds to an advertising space on a web site of the meta item slot group on which an ad can be shown.

16. The method of claim 15, wherein the first type of the plurality of items comprises member ads, and the second type of the plurality of items comprises sponsor ads.

17. The method of claim 13, wherein each of the plurality of the items of the first type and each of the plurality of the items of the second type has a fill quota, wherein allocating each of the plurality of the items comprises filling a number of item slots that are unfilled with the item equal to the quota.

18. A computer-implemented method for distributing items of a first type and items of a second type into item slots arranged in a plurality of item slot groups, wherein items of the second type are defined with a greater granularity than items of the first type, such that items of the second type can have group and meta characteristics, while items of the first type have meta characteristics but not group characteristics, comprising the steps of:

providing:
  a plurality of items of the first type, each item of the first type having a meta characteristic;
  a plurality of items of the second type, each item of the second type having both a group characteristic and a meta characteristic;
  a plurality of item slots, such that a number of item slots provided is equal to a number of empty slots available in an inventory, each item slot having both a meta characteristic and a group characteristic, each item slot being unfilled, each item slot being able to be filled by an item of the first type having a corresponding meta characteristic, and each item slot is being able to be filled by an item of the second type having the corresponding meta characteristic and a corresponding group characteristic;

using the plurality of item slots, constructing a plurality of item slot groups, such that item slots having the same group characteristic are included in the same item slot group;

constructing a meta item slot group for each different meta characteristic, each meta item slot group so constructed including a number of meta item slots equal to the number of the item slots sharing the same meta characteristic, each meta item slot being initially unfilled, and able to be filled by either an item of the first type having the same meta characteristic, or an item of the second type having the same meta characteristic;

allocating each of the plurality of items of the first type over the meta item slots that are unfilled by matching meta characteristics of the first type of items to meta characteristics of the meta item slots, such that allocating an item to a meta item slot fills the meta item slot with the item;

allocating each of the plurality of items of the second type over the meta item slots that are not already filled by items of the first type, by matching meta characteristics of the second type of items to meta characteristics of the meta item slots, such that allocating an item to a meta item slot fills the meta item slot with the item, thereby determining a number of items of the second type required to fill all meta item slots unfilled by items of the first type;

for each item of the second type allocated over a meta item slot, also allocating that item of the second type over an item slot in an item slot group by matching meta and group characteristics of the item of the second type to respective meta and group characteristics of the item slot, such that allocating an item to an item slot fills the item slot with the item; and for each item of the first type allocated over a meta item slot, also allocating that item of the first type over an unfilled item slot in an item slot group by matching meta characteristics of the item of the first type of items to meta characteristics of the item slot, such that allocating an item to an item slot fills the item slot with the item, thereby distributing items of the first type and items of the second type into item slots arranged in a plurality of item slot groups.

19. A computer-implemented method for distributing items of a first type and items of a second type into item slots arranged in a plurality of sub item slot groups and item slot groups, wherein items of the second type are defined with a greater granularity than items of the first type, comprising the steps of:
  providing:
    a plurality of items of the first type, each item of the first type having a meta characteristic;
    a plurality of items of the second type, each item of the second type having a sub group characteristic, a group characteristic, and a meta characteristic;
    a plurality of item slots, such that a number of item slots provided is equal to a number of empty slots available in an inventory, each item slot having a meta characteristic, a group characteristic, and a sub group characteristic, each item slot being initially unfilled and able to be filled by an item of the first type having the corresponding meta characteristic and no group characteristic, and each item slot being able to be filled by an item of the second type having the corresponding meta characteristic, the corresponding group characteristic, and the corresponding sub group characteristic, wherein an item slot that is empty is filled by only a single item having the corresponding characteristics;
  organizing the plurality of item slots into sub item slot groups, such that each different sub item slot group includes only those item slots that can be filled by items having the same meta characteristics, group characteristics, and sub group characteristics;
  organizing the sub item slot groups into item slot groups, such that each different item slot group includes only those sub item slot groups whose item slots can be filled by items having the same meta characteristics and group characteristics;
  constructing a meta item slot group for each different meta characteristic of the item slots, each meta item slot group including a number of meta item slots equal to the number of the item slots having the same meta characteristic, each meta item slot being initially unfilled and able to be filled by an item of the first type having the corresponding meta characteristic, and an item of the second type having the corresponding meta characteristic, the corresponding group characteristic, and the corresponding sub group characteristic, such that an empty meta item slot is filled by only a single item having the corresponding characteristic;
  allocating each of the plurality of items of the first type over the meta item slots that are unfilled by matching meta characteristics of the first type of items to the meta item slots, such that allocating an item to a meta item slot fills the meta item slot with the item;
  allocating each of the plurality of items of the second type over the meta item slots that are not already filled by items of the first type, by matching meta characteristics, group characteristics, and sub group characteristics of the second type of items to the meta item slots, such that allocating an item to a meta item slot fills the meta item slot with the item, thereby determining a number of items of the second type required to fill all meta item slots unfilled by items of the first type;
  for each item of the second type that is allocated over a meta item slot, also allocating that item of the second type over an item slot in a sub item slot group by matching meta characteristics, group characteristics, and sub group characteristics of the second type of items to the item slots, such that allocating an item to an item slot fills the item slot with the item, thereby filling the item slots with the same number of items of the second type that filled the meta item slots;
  for each item of the first type allocated over a meta item slot, also allocating that item of the first type over an unfilled item slot in an item slot group by matching meta characteristics of the item to meta characteristics of the item slot, such that allocating an item to an item slot fills the item slot with the item, thereby distributing items of the first type and items of the second type into item slots arranged in a plurality of sub item slot groups.

20. A computer-implemented method for allocating items to an available inventory of empty item slots, comprising the steps of:
  determining a number of item slots available in an inventory that are empty, such that each item slot that is empty can be filled by either an item of a first type having a corresponding broad characteristic and no narrow characteristic, or an item of a second type having both a corresponding broad characteristic and a corresponding narrow characteristic, and wherein each item slot that is empty is filled by only a single item having the corresponding characteristic;
  organizing the item slots that are empty into item slot groups, such that each item slot group includes only those item slots that can be filled by items of the second type having the same narrow characteristic;
  constructing a meta item slot group for each different broad characteristic that can be used to fill the item slots, each meta item slot group having a number of meta item slots equal to a total number of item slots that can be filled by items having that broad characteristic, each meta item slot being initially unfilled, and able to be filled by an item having the same broad characteristic;
  allocating a plurality of items of a first type over the meta item slots by matching broad characteristics of the first type of items to broad characteristics of the meta item slot, such that allocating an item of the first type to a meta item slot fills the meta item slot with the item;
  allocating a plurality of items of a second type over the meta item slots that are not filled by items of the first type by matching broad characteristics of the second type of items to broad characteristics of the meta item slot, such that allocating an item of the second type to a meta item slot fills the meta item slot with the item, thereby determining how many items of the second type can be accommodated in the item slots;
  for each item of the second type that is allocated to a meta item slot, also allocating that item of the second type to an item slot that is unfilled, by matching narrow characteristics of the second type of items to narrow characteristics of the item slot, such that allocating an item of the second type to an item slot fills the item slot with the item, thereby filling a first portion of the item slots;
  for each item of the first type that is allocated to a meta item slot, also allocating that item of the first type to an item slot that is unfilled by an item of the second type, by matching broad characteristics of the first type of items to broad characteristics of the item slot, such that allocating an item of the first type to an item slot fills the item slot with the item, thus filling the remaining portion of the item slots, thereby allocating items of the first type and the second type to the available inventory of empty item slots.

21. A computer-implemented method comprising the steps of:

constructing a plurality of item slot groups, each item slot group having a number of item slots, each item slot initially unfilled and able to be filled by an item, such that a total number of item slots in the plurality of item slot groups is equal to a number of empty slots available in an inventory;

constructing a plurality of meta item slot groups, each meta item slot group encompassing at least one item slot group and having a number of meta item slots equal to a total number of item slots of the at least one item slot group the meta item slot group encompasses, each meta item slot initially unfilled and able to be filled by an item;

allocating each of a plurality of items of a first type over the meta item slots of the meta item slot groups that are unfilled by matching characteristics of the first type of items to characteristics of the meta item slot groups, such that allocating an item to a meta item slot fills the meta item slot with the item, each item of the first type not having any characteristics corresponding to a specific item slot group;

allocating each of a plurality of items of a second type over both the meta item slots of the meta item slot groups that are unfilled and the item slots of the item slot groups that are unfilled by matching characteristics of the second type of items to the respective characteristics of the item slot groups and the meta item slot groups, such that allocating an item to an item slot fills the item slot with the item, and allocating an item to a meta item slot fills the meta item slot with the item; and, for each meta item slot group, allocating each of the plurality of items of the first type that have been allocated to a meta item slot over the item slots of the at least one item slot group encompassed by that meta item slot group that are unfilled, such that allocating an item to an item slot fills the item slot.

* * * * *